Patented Aug. 25, 1942

2,293,773

UNITED STATES PATENT OFFICE 2,293,773

ALPHA - BETA - DICHLORO - PARA - TOLYL-ETHANE

Frank J. Soday, Upper Darby, Pa., assignor to The United Gas Improvement Company, a corporation of Pennsylvania No Drawing. Application October 21, 1938, Serial No. 236,261

2 Claims. (Cl. 260—651)

The present invention relates to a new composition of matter and to methods for its preparation.

More particularly, this invention pertains to para-methyl styrene dichloride and a process for its preparation and purification.

It is an object of the present invention to provide a new composition of matter and a process for its preparation and purification. More specifically, it is an object of the invention to provide a process for the preparation from certain hydrocarbon fractions of a new compound which is an excellent solvent for a wide variety of materials and industrial products. A further specific object of the invention is to provide a valuable derivative of para-methyl styrene from certain hydrocarbon fractions containing para-methyl styrene. Another object of the invention is to obtain para-methyl styrene dichloride by the chlorination of para-methyl styrene obtained in distillation fractions of light oil, or drip oil, or cracked hydrocarbon products resulting from the manufacture of combustible gas by processes involving the pyrolytic decomposition of hydrocarbon products. Still another object is the preparation of a new compound which will serve as an excellent starting material for the production of various derivatives of para-methyl styrene. Other objects and advantages of the invention will be apparent to those skilled in the art from the following descriptions.

This invention is based upon the discovery that certain hydrocarbon fractions containing para-methyl styrene may be chlorinated to yield para-methyl styrene dichloride. The new compound thus obtained may be represented by the following structural formula

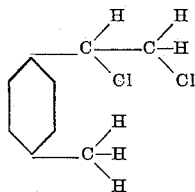

This compound may also be referred to as alpha-beta-dichloro-para-tolylethane.

The properties of a representative sample of this new composition of matter, para-methyl styrene dichloride, were found to be as follows:

Boiling point—Approximately 98° C. at 4 mm. of mercury, absolute
Refractive index, (N 20/D)—1.5440
Density (D 20/4)—1.189
Molecular refractivity—50.24
Molecular weight—188
Chlorine content—37.2%
Color—Colorless It is thought that due to the possible presence of minute quantities of impurities the boiling point, refractive index and density might vary slightly from the values given. For instance, the boiling point at approximately 4 mm. of mercury might vary from 94° C. to 102° C., the refractive index from 1.5435 to 1.5450 and the density from 1.1880 to 1.1890. It will be appreciated that it is extremely difficult to accurately determine a boiling point at the extremely low pressures employed.

This new composition of matter decomposes somewhat upon distillation unless extremely low pressures in the neighborhood of 1 to 4 mm. of mercury, absolute, are employed.

Para-methyl styrene dichloride is an excellent solvent for a wide variety of compounds and industrial products. In addition, it is an excellent starting material for the production of various derivatives of para-methyl styrene such as esters, ethers, aldehydes, acetals, acids, and the like.

The following specific example is given in illustration of one method of preparing the new composition of matter, but it will be understood that the invention is not limited to the details therein given.

Example

A hydrocarbon fraction containing para-methyl styrene was secured by the distillation of light oil obtained in the manufacture of oil gas. This fraction had the following properties:

5% boiling point—169.0° C. @ 760 mm.
50% boiling point—169.8° C. @ 760 mm.
90% boiling point—172.6° C. @ 760 mm.
Density (D 20/4) =0.8941
Refractive index (N 20/D) =1.5239
Unsaturation=58.0% (McIlhiney bromination method)

A quantity representing 1050 parts by weight of the para-methyl styrene fraction was washed with a small quantity of a 10% potassium hydroxide solution to remove impurities such as phenolic compounds. After removal of the potassium hydroxide solution, the hydrocarbon fraction was washed with water until the washings were neutral to litmus. The para-methyl styrene fraction was then dissolved in 800 parts by weight of carbon tetrachloride. Any other suitable solvent might have been employed. This mixture was dried with anhydrous magnesium sulfate, filtered to remove all solid materials, and cooled to a temperature of −10° C. Chlorine was slowly run into the solution, with continuous stirring, until hydrogen chloride was evolved when the chlorination was terminated. A total of approximately 310 parts by weight of chlorine was added during the period of chlorination, which lasted approximately ten hours. The reaction mixture was then allowed to come to room temperature and the acidic constituents removed by adding a small quantity of calcium carbonate. Anhydrous magnesium sulfate was added to the reaction mixture to remove any moisture present and the material was subsequently filtered. Carbon tetrachloride was removed by distillation under reduced pressure. The chlorinated fraction remaining after the removal of the carbon tetrachloride amounted to 1125 parts by weight.

To separate the para-methyl styrene dichloride contained within this mixture, the chlorinated fraction was fractionally distilled at a pressure of between 4.0 and 6.5 mm. of mercury, absolute, in a small diameter packed fractionating column using a 7:1 reflux ratio, the fractionating efficiency being equivalent to 10 theoretical plates. A total of 345 parts by weight of para-methyl styrene dichloride boiling between 94 and 102° C. at approximately 4 mm. of mercury absolute was obtained by this fractionation.

A determination of the chlorine content of this compound indicated that it contained 37.2% chlorine. The theoretical chlorine content for methyl styrene dichloride is 37.5%. A determination of the molecular refractivity of this new compound was made. This fraction was found to have a molecular refractivity of 50.24, whereas the calculated molecular refractivity for para-methyl styrene dichloride is 49.89.

The new compound was identified as para-methyl styrene dichloride by converting portions of it into other compounds, the properties of which were known and could be verified.

A portion of the para-methyl styrene dichloride was oxidized with potassium permanganate in alkaline solution. The manganese dioxide thus formed was removed by filtration and the filtrate acidified with dilute hydrochloric acid. There was obtained a copious white precipitate which was identified as terephthalic acid having the following structural formula.

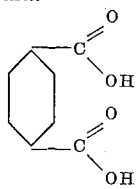

The terephthalic acid was converted to its dimethyl derivative which was found to have a melting point of 140° C. corresponding with the known melting point for di-methyl terephthalate.

The new compound was further identified as para-methyl styrene dichloride, by extracting the aqueous filtrate from the terephthalic acid with ether, whereby there was obtained a small quantity of a solid acid. This was identified as para-toluic acid,

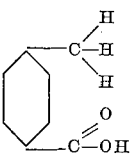

which is a primary oxidation product of para-methyl styrene dichloride.

The identification of this new compound as para-methyl styrene dichloride was thus clearly verified.

Although the para-methyl styrene dichloride thus prepared was obtained from a hydrocarbon fraction secured by the distillation of light oil obtained in the manufacture of oil gas, para-methyl styrene dichloride may be prepared from other hydrocarbon fractions containing para-methyl styrene such as those obtained from cracked hydrocarbon products including light oil obtained in the manufacture of carburetted water gas or those secured by the distillation of drip oil such as obtained from oil gas or carburetted water gas.

Crude or refined fractions from the foregoing sources containing any quantity of para-methyl styrene may be used in the preparation of para-methyl styrene dichloride. Such fractions or mixtures should, however, contain substantial portions of para-methyl styrene in order to render the process economically feasible. In general, it has been found advisable to use light oil fractions with a 5% boiling point of at least 165° C. and a 90% boiling point not higher than 175° C. The 5% and 90% boiling points are used because the initial and end boiling points of these materials are difficult of determination. In general, it is also desirable to have a substantial portion of the material in the boiling range of 168° C. to 172° C.

The invention in general is not limited to the chlorination and purification process described which is given by way of illustration. The reaction may be carried out in either the liquid or vapor phase, with or without the addition of solvents or diluents, at temperatures ranging from $-40°$ C. to the boiling point of the compounds, and with or without the use of suitable chlorinating catalysts. The chlorine used in the process may be in either the liquid or gaseous state, and it may be added to the reaction vessel as such or it may be generated in situ. The chlorination process may be carried out batchwise, semi-continuously, or continuously, and the reactants may be contacted in a concurrent or counter-current manner.

My new composition of matter, namely para-methyl styrene dichloride, is an excellent starting material in the preparation of other compounds. As an example pure para-methyl styrene might be prepared by reacting my para-methyl styrene dichloride with a substance for the removal of the chlorine present such as zinc dust, zinc-copper complex, sodium in liquid ammonia, and the like.

While a procedure for the purpose of carrying out the invention has been particularly described, it is to be understood that this is by way of illustration only. Therefore, changes, omissions, additions, substitutions, and/or modifications may be made within the scope of the claims without departing from the spirit of the invention.

I claim:
1. Alpha-beta-dichloro-para-tolylethane.
2. A process for preparing alpha-beta-dichloro-para-tolylethane which comprises treating with gaseous chlorine a para-methyl styrene fraction separated from light oil obtained in the manufacture of combustible gas wherein a hydrocarbon product is pyrolytically decomposed, said fraction being substantially free from phenolic compounds, and separating the alpha-beta-dichloro-para-tolylethane from the resulting mixture.

FRANK J. SODAY.